United States Patent
Lee et al.

(10) Patent No.: US 8,320,488 B2
(45) Date of Patent: Nov. 27, 2012

(54) METHOD FOR TRANSMITTING AND RECEIVING SIGNALS IN OPEN-LOOP SPATIAL MULTIPLEXING MODE

(75) Inventors: Moon Il Lee, Anyang-si (KR); Jin Young Chun, Anyang-si (KR); Hyun Soo Ko, Anyang-si (KR); Bin Chul Ihm, Anyang-si (KR); Wook Bong Lee, Anyang-si (KR)

(73) Assignee: LG Electronics Inc., Seoul (KR)

( * ) Notice: Subject to any disclaimer, the term of this patent is extended or adjusted under 35 U.S.C. 154(b) by 711 days.

(21) Appl. No.: 12/382,366

(22) Filed: Mar. 13, 2009

(65) Prior Publication Data

US 2010/0166094 A1    Jul. 1, 2010

Related U.S. Application Data

(60) Provisional application No. 61/036,475, filed on Mar. 14, 2008.

(30) Foreign Application Priority Data

Aug. 18, 2008    (KR) .................. 10-2008-0080461

(51) Int. Cl.
    *H04B 7/02*    (2006.01)
(52) U.S. Cl. ....................................... 375/267; 375/219
(58) Field of Classification Search ............. 375/267, 375/219
    See application file for complete search history.

(56) References Cited

U.S. PATENT DOCUMENTS

| | | | | |
|---|---|---|---|---|
| 7,944,985 B2* | 5/2011 | Elgamal et al. | | 375/267 |
| 8,073,068 B2* | 12/2011 | Kim et al. | | 375/267 |
| 2009/0028264 A1* | 1/2009 | Zhang et al. | | 375/267 |

FOREIGN PATENT DOCUMENTS

| | | |
|---|---|---|
| KR | 10-2008-0020585 | 3/2008 |
| WO | WO 2006/130541 | 12/2006 |
| WO | WO 2007/051208 | 5/2007 |
| WO | WO 2007/091836 | 8/2007 |

OTHER PUBLICATIONS

R1-080898, "Draft CR to 36.211 v8.1.0 including decisions from RAN1#51bis," Ericsson, 3GPP TSG RAN WG1 Meeting #52.*

(Continued)

*Primary Examiner* — Shuwang Liu
*Assistant Examiner* — Nader Bolourchi
(74) *Attorney, Agent, or Firm* — McKenna Long & Aldridge LLP (57) ABSTRACT

A method for transmitting and receiving signals in an open-loop spatial multiplexing transmission mode is described. If the number of transmit antennas is 2 and a rank is 2, a base station performs precoding according to a cyclic delay diversity scheme by a matrix in which a first matrix corresponding to an identity matrix, a second matrix corresponding to a diagonal matrix, and a third matrix corresponding to a unitary matrix are sequentially multiplied and transmits the precoded signals. This may be substantially the same as the case where the base station performs precoding using a matrix in which the second matrix corresponding to the diagonal matrix and the third matrix corresponding to the unitary matrix are multiplied and transmits the precoded signals. A user equipment estimates a transmission mode according to the received rank indicator and the number of transmit antennas and receives signals.

13 Claims, 6 Drawing Sheets

OTHER PUBLICATIONS

"Singular value decomposition," Wikipedia, the free encyclopedia, http://en.wikipedia.org/wiki/Singular_value_decomposition.*
R1-080001, "Draft agenda RAN1#51bis," 3GPP TSG Ran WG1 Meeting #51bis.*
Over 3GPP TS 36.211: "Physical Channels and Modulation", Technical Specification Group Radio Access Network; 3rd Generation Partnership Project (Release 8), V1.1.0 (May 2007).*
"Singular value decomposition," Wikipedia, the free encyclopedia, _Jul. 31, 2004_Internet Archive_<http://web.archive.org/web/20040731085210/http://en.wikipedia.org/wiki/Singular_value_decomposition>.*

* cited by examiner

METHOD FOR TRANSMITTING AND RECEIVING SIGNALS IN OPEN-LOOP SPATIAL MULTIPLEXING MODE

CROSS-REFERENCE TO RELATED APPLICATIONS

This application claims the benefit of the U.S. Provisional Application No. 61/036,475, filed on Mar. 14, 2008, which is hereby incorporated by reference as if fully set forth herein.

This application claims the benefit of the Korean Patent Application No. 10-2008-0080461, filed on Aug. 18, 2008, which is hereby incorporated by reference as if fully set forth herein.

BACKGROUND OF THE INVENTION

1. Field of the Invention

The present invention relates to a multiple-input multiple-output (MIMO) mobile communication system, and more particularly, to a method for efficiently transmitting and receiving signals in an open-loop spatial multiplexing mode.

2. Discussion of the Related Art

With the popularization of information communication services, the emergence of various multimedia services, and the provision of high-quality services, demand for rapid wireless communication service has increased. To actively cope with such demand, first of all the capacity of a communication system should be increased. To increase communication capacity in a wireless communication environment, there can be considered a method for newly searching available frequency bands and a method for increasing efficiency for limited resources. As to the latter method, multiple transmit and receive antenna techniques have recently drawn attention and have been actively developed. The multiple transmit and receive antenna technique obtains a diversity gain by equipping a transmitter and a receiver with a plurality of antennas to additionally ensure a spatial region for utilizing resources, or increases transmission capacity by transmitting data in parallel through the respective antennas.

A MIMO system using an orthogonal frequency division multiplexing (OFDM) among the multiple transmit and receive antenna techniques will now be described.

Figure 1:
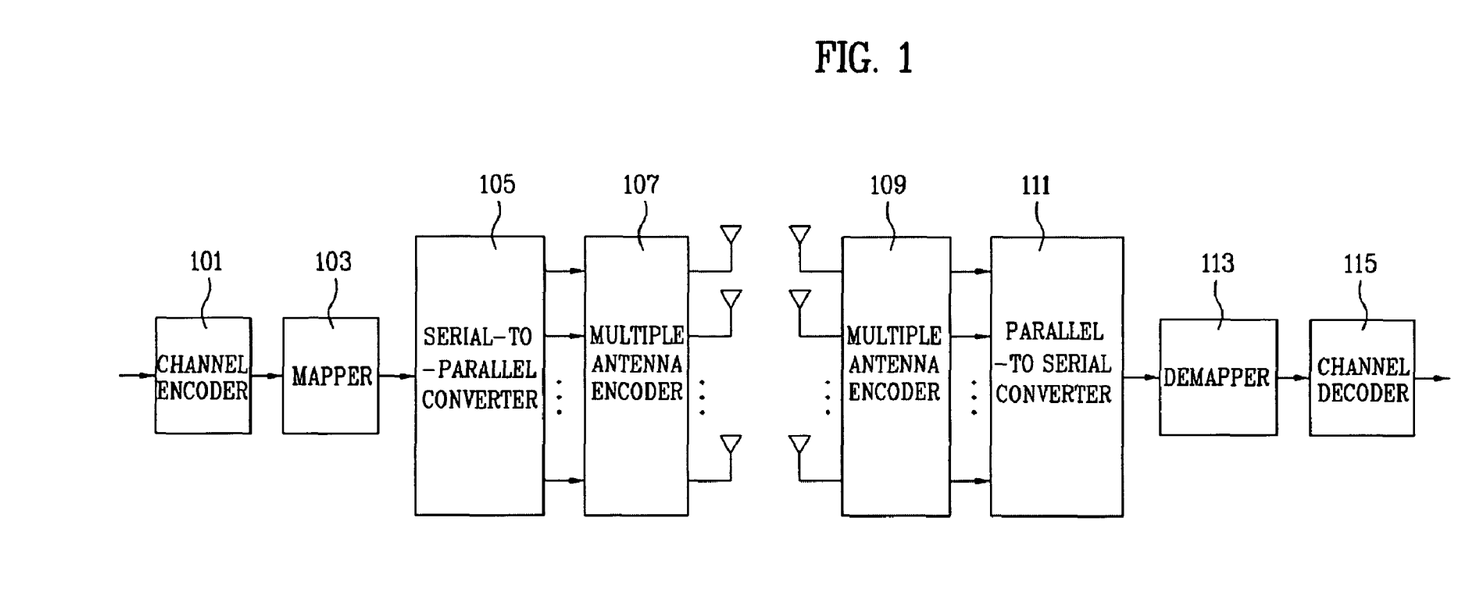
FIG. 1 illustrates a general structure of a multiple transmit and receive antenna system using OFDM.

FIG. 1 illustrates a general structure of a multiple transmit and receive antenna system using OFDM.

In a transmitting side, a channel encoder 101 adds redundancy bits to transmission data bits to reduce an influence of a channel or noise, and a mapper 103 converts data bit information into data symbol information. A serial-to-parallel converter 105 parallelizes the data symbol information to carry data symbols on a plurality of subcarriers. A multiple antenna encoder 107 converts the parallelized data symbols into time-space signals. In a receiving side, a multiple antenna decoder 109, a parallel-to-serial converter 111, a demapper 113, and a channel decoder 115 respectively perform the reverse functions of the functions performed in the multiple antenna encoder 107, the serial-to-parallel converter 105, the mapper 103, and the channel encoder 101 of the transmitting side.

The multiple antenna OFDM system requires various techniques to improve the reliability of data transmission. A space-time coding (STC) scheme and a cyclic delay diversity (CDD) scheme are used to raise a spatial diversity gain. A beam forming scheme and a precoding scheme are used to increase a signal-to-noise ratio (SNR). The STC and CDD schemes are mainly used to improve transmission reliability of an open-loop system which can not use feedback information in a transmitting side. The beam forming and precoding schemes are used to maximize the SNR through corresponding feedback information in a closed-loop system which is capable of using feedback information in the transmitting side.

In the above-described techniques, the CDD scheme for increasing the spatial diversity gain and the precoding scheme for raising the SNR will now be described.

The CDD scheme causes all antennas to transmit signals with different delays or different sizes in transmitting OFDM signals in a system having multiple transmit antennas, so that a receiving side obtains a frequency diversity gain.

Figure 2:
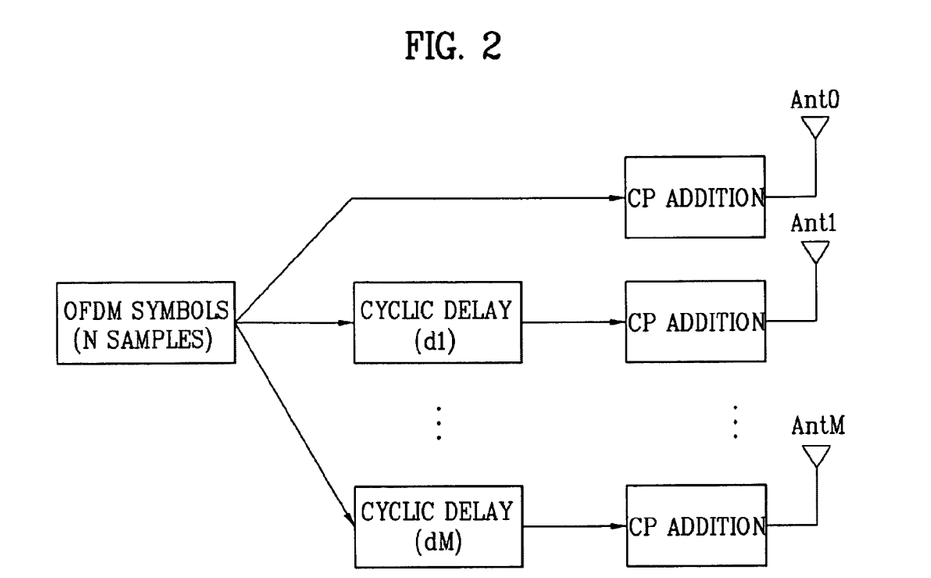
FIG. 2 illustrates a structure of a transmitting side of a multiple antenna system using a CDD scheme.

FIG. 2 illustrates a structure of a transmitting side of a multiple antenna system using a CDD scheme.

While OFDM symbols are separated through a serial-to-parallel converter and a multiple antenna encoder and transmitted to each antenna, a cyclic prefix (CP) for preventing interference between channels is added and then transmitted to a receiving side. In this case, a data sequence transmitted to the first antenna is transmitted to the receiving side without delay, and data sequences transmitted to the next antennas are cyclically delayed by a predetermined sample compared with the preceding antennas.

Meanwhile, if the CDD scheme is performed in a frequency domain, the cyclic delay may be expressed as a multiplication of phase sequences.

Figure 3:
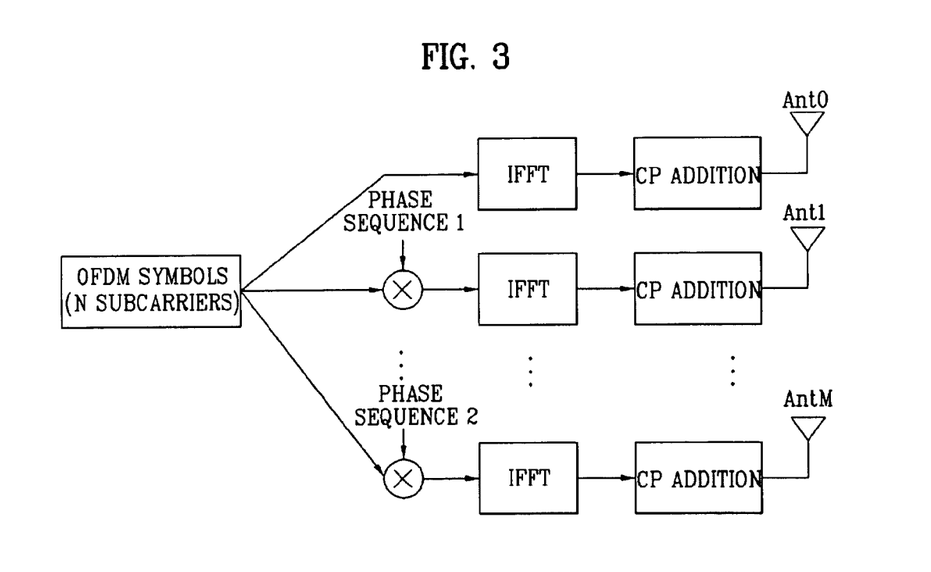
FIG. 3 illustrates a method for performing the CDD scheme shown in FIG. 2 in a frequency domain.

FIG. 3 illustrates a method for performing the CDD scheme shown in FIG. 2 in a frequency domain.

As shown in FIG. 3, data sequences in a frequency domain are multiplied by phase sequences (phase sequence 1 to phase sequence M) which are differently set according to antennas, and thereafter, inverse fast Fourier transform (IFFT) is performed to transmit the data sequences to a receiving side. This method is referred to as a phase-shift diversity scheme.

The phase-shift diversity scheme may convert a flat fading channel into a frequency selective channel, and obtain a frequency diversity gain through a channel code or a multi-user diversity gain through frequency selective scheduling.

Meanwhile, the precoding scheme includes a codebook based precoding method used when feedback information is finite in a closed-loop system and a method for performing feedback upon quantization of channel information. Codebook based precoding refers to obtaining an SNR gain by feeding back an index of a precoding matrix, which is previously known by transmitting and receiving sides, to the transmitting side.

Figure 4:
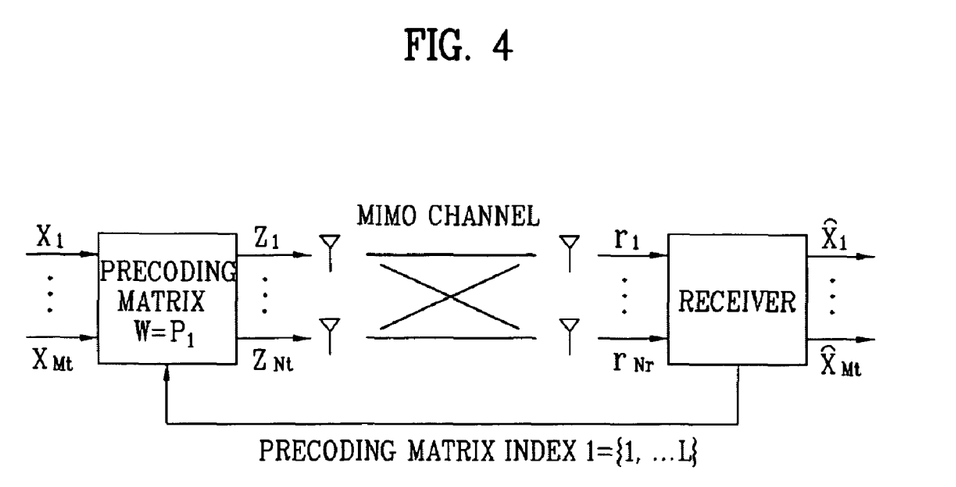
FIG. 4 illustrates a structure of transmitting and receiving sides of a multiple antenna system using codebook based precoding.

FIG. 4 illustrates a structure of transmitting and receiving sides of a multiple antenna system using codebook based precoding.

The transmitting side and receiving side respectively include finite precoding matrixes $P_1$ to $P_L$. The receiving side feeds back an optimal precoding matrix index I to the transmitting side using channel information. The transmitting side may apply a precoding matrix corresponding to the fed back index to transmission data $X_1$ to $X_{Mt}$.

The above-described phase-shift diversity scheme or the CDD scheme may have different requirements in an open-loop type and a closed-loop type depending on whether the feedback information is demanded. That is, it may be desirable that different precoding matrixes be used in an open-loop CDD scheme and a closed-loop CDD scheme.

Under such an assumption it is necessary to definitely specify a method for selecting a proper precoding matrix while acquiring a sufficient frequency diversity gain and simultaneously minimizing the complexity of achievement according to each CDD scheme, and for efficiently transmitting and receiving signals.

SUMMARY OF THE INVENTION

Technical Problem

An object of the present invention devised to solve the problem lies in providing a method for selecting a precoding matrix which can simplify achievement while obtaining a sufficient frequency diversity gain under various channel environments according to transmission modes.

Another object of the present invention devised to solve the problem lies in providing a method for efficiently transmitting and receiving signals between transmitting and receiving sides according to CDD schemes using the selected precoding matrix.

Technical Solution

The object of the present invention can be achieved by providing a method for a user equipment to receive signals in an open-loop spatial multiplexing transmission mode. The method includes: receiving information about a rank indicator (RI) and the number of antennas from a base station; and if the number of transmit antennas is 2, estimating that the base station transmits signals through precoding by a matrix (WDU) in which a first matrix (W) corresponding to an identity matrix (I), a second matrix (D) corresponding to a diagonal matrix, and a third matrix (U) corresponding to a unitary matrix are sequentially multiplied; and receiving signals according to the estimation result. If the rank indicator indicates a number greater than 1, the method may further include estimating that the base station transmits signals according to a cyclic delay diversity (CDD) scheme.

In another aspect of the present invention, provided herein is a method for a base station to transmit signals in an open-loop spatial multiplexing transmission mode. The method includes: if a transmission rank is greater than 1, transmitting signals according to a cyclic delay diversity (CDD) scheme, wherein the transmitting of signals includes, if the number of transmit antennas is 2, performing precoding of transmission signals by a matrix (WDU) in which a first matrix (W) corresponding to an identity matrix (I), a second matrix (D) corresponding to a diagonal matrix, and a third matrix (U) corresponding to a unitary matrix are sequentially multiplied; and mapping the precoded signals to resource elements and transmitting the mapped signals.

In the embodiments, the second matrix (D) may be a 2×2 matrix when the number of transmit antennas is 2 and a rank designated by the rank indicator is 2. The base station in the open-loop spatial multiplexing transmission mode may fixedly use the first matrix as $$\frac{1}{\sqrt{2}}\begin{pmatrix} 1 & 0 \\ 0 & 1 \end{pmatrix},$$

and the user equipment may not feed back a precoding matrix index to the base station.

In a further aspect of the present invention, provided herein is a method for a base station to transmit signals in an open-loop spatial multiplexing transmission mode. The method includes: if the number of transmit antennas is 2 and a transmission rank is 2, performing precoding of transmission signals according to a cyclic delay diversity (CDD) scheme by a matrix (DU) in which a first matrix (D) corresponding to a diagonal matrix and a second matrix (U) corresponding to a unitary matrix are sequentially multiplied; and mapping the precoded signals to resource elements and transmitting the mapped signals.

Advantageous Effects

According to embodiments of the present invention, a sufficient diversity gain can be simply achieved for each transmission mode.

BRIEF DESCRIPTION OF THE DRAWINGS

The accompanying drawings, which are included to provide a further understanding of the invention, illustrate embodiments of the invention and together with the description serve to explain the principle of the invention.

In the drawings.

DETAILED DESCRIPTION OF THE INVENTION

Reference will now be made in detail to the exemplary embodiments of the present invention, examples of which are illustrated in the accompanying drawings. The detailed description, which will be given below with reference to the accompanying drawings, is intended to explain exemplary embodiments of the present invention, rather than to show the only embodiments that can be implemented according to the invention. For example, the following description is given by way of example of a $3^{rd}$ generation partnership project long term evolution (3GPP LTE) system, but may be applied to any wireless communication systems using a general multiple antenna system by the same principle. Furthermore, in the following description, the term 'base station' may be replaced with 'Node B', 'eNode B', etc. and the term 'mobile terminal' may be replaced with 'user equipment (UE)', 'mobile station (MS)', etc.

The following detailed description includes specific details in order to provide a thorough understanding of the present invention. However, it will be apparent to those skilled in the art that the present invention may be practiced without such specific details. In some instances, known structures and devices are omitted or are shown in block diagram form, focusing on important features of the structures and devices, so as not to obscure the concept of the present invention. The same reference numbers will be used throughout this specification to refer to the same or like parts.

In accordance with one aspect of the present invention, there is provided a method for selecting a precoding matrix which can obtain a sufficient frequency diversity gain in various channel environments according to transmission modes and can be easily achieved, and for efficiently transmitting and receiving signals using the selected precoding matrix. To this end, a downlink of the 3GPP LTE system according to transmission modes will be described in detail and a method for transmitting and receiving signals according to a CDD scheme by efficiently constructing the precoding matrix in an open-loop spatial multiplexing mode will be described. However, the downlink of the 3GPP LTE system is illustrative only and the present invention may be applied to other wireless communication environments.

Figure 5:
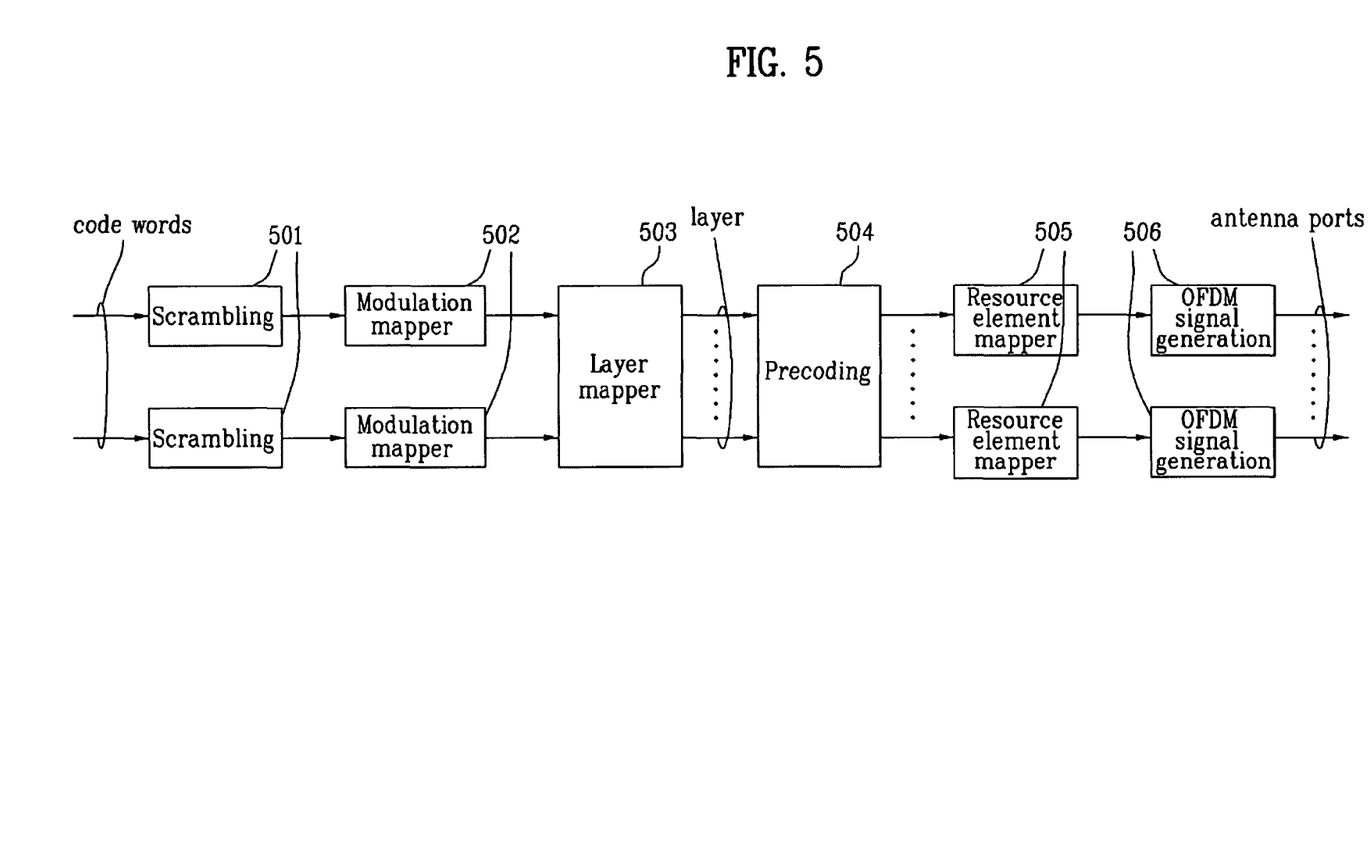
FIG. 5 is a conceptual view schematically illustrating a transmission process of a downlink physical channel in a 3GPP LTE system.

FIG. 5 is a conceptual view schematically illustrating a transmission process of a downlink physical channel in a 3GPP LTE system.

Codewords generated through channel coding are scrambled in scramblers 501 through which scrambled bit blocks are generated. The bit blocks are generated by modulation mappers 502 as modulation symbols modulated to quadrature phase-shift keying (QPSK), 16 quadrature amplitude modulation (16 QAM), or 64 QAM. The modulation symbols are mapped to one or more layers by a layer mapper 503. In the 3GPP LTE system, up to two codewords can be simultaneously transmitted and the two codewords may be mapped to four or less layers according to a prescribed reference.

The layer-mapped symbols are precoded by a precoder 504. The precoding scheme includes: (1) precoding for spatial multiplexing (SM); and (2) precoding for spatial transmission diversity. The precoding for SM includes: (a) precoding for SM without the application of CDD; and (b) precoding for large delay CDD. In an open-loop SM transmission mode, if a transmission rank is larger than 1, a base station transmits signals according to a CDD based precoding scheme. For a system having two transmit antennas, that is, a 2-Tx system, the base station may transmit signals through precoding based on a fixed, specific precoding matrix. For a system of four transmit antennas, a 4-Tx system, the base station may transmit signals by cyclically applying different precoding schemes to respective resource elements.

The transmission symbols which have been precoded are mapped to proper resource elements by resource element mappers 505 and transmitted through transmission antennas via OFDM signal generators 506.

Meanwhile, the precoding for SM in the above-described precoding schemes utilizes methods for reducing signaling overhead using a specific precoding matrix within a predetermined codebook between transmitting and receiving sides. Among these methods, the precoding for large delay CDD will be described below in detail. In the following description, the precoding for large delay CDD may be referred to as a 'CDD based precoding', 'CDD precoding', or 'phase-shift based precoding' unless such use causes confusion.

Basic Structure of CDD Based Precoding—Du Structure

The phase-shift based precoding serves to transmit all streams to be transmitted through all antennas after being multiplied by sequences of different phases. Generally, when generating a phase sequence using a cyclic delay value, a frequency selective channel is generated in terms of a receiver and the size of a channel is increased or decreased according to a frequency region.

A phase-shift based precoding matrix P can be expressed in the following manner.

$$P^k_{N_t \times R} = \begin{pmatrix} w^k_{1,1} & w^k_{1,2} & \cdots & w^k_{1,R} \\ w^k_{2,1} & w^k_{2,2} & \cdots & w^k_{2,R} \\ \vdots & \vdots & \ddots & \vdots \\ w^k_{N_t,1} & w^k_{N_t,2} & \cdots & w^k_{N_t,R} \end{pmatrix}$$ [Equation 1]

Here, k indicates a resource index, for example, a subcarrier index, or a virtual time-frequency resource or a specific frequency band index, $W^k_{i,j}$ (where $i=1, \ldots, N_t$, and $j=1, \ldots, R$) indicates a complex weight value determined by k, $N_t$ indicates the number of transmit antennas, and R indicates an SM rate. The complex weight value may have different values according to an OFDM symbol multiplied to the antennas and a corresponding subcarrier index. The complex weight value may be determined according to at least one of a channel environment and presence/absence of feedback information.

Meanwhile, the precoding matrix P of Equation 1 is desirably designed to reduce the loss in channel capacity of a multiple antenna system. To this end, the channel capacity of a multiple antenna open-loop system may be expressed as follows.

$$Cu(H) = \log_2\left(\det\left(II_{N_r} + \frac{SNR}{N}HH^H\right)\right)$$ [Equation 2]

Here, H indicates a multiple antenna channel matrix having a size of $N_r \times N_t$, and $N_r$ indicates the number of receive antennas. When applying the phase-shift based precoding matrix P of Equation 1 to Equation 2, the following Equation 3 is obtained.

$$C_{precoding} = \log_2\left(\det\left(II_{N_r} + \frac{SNR}{N}HPP^H H^H\right)\right)$$ [Equation 3]

As indicated in Equation 3, since $PP^H$ should be an identity matrix to eliminate the loss of channel capacity, the phase-shift based precoding matrix P should desirably satisfy the following condition.

$$PP^H = II_N$$ [Equation 4]

That is, it is desired that the phase-shift based precoding matrix P is based on a unitary matrix.

The afore-described phase-shift based precoding matrix may be expressed as the following Equation 5 with respect to a system in which the number of antennas is $N_t$ (where $N_t$ is a natural number equal to or greater than 2) and an SM rate is R (where R is a natural number equal to or greater than 1). Since Equation 5 may be obtained by generalizing a conventional phase-shift diversity scheme, a multiple antenna scheme of Equation 5 will be referred to as generalized phase-shift diversity (GPSD).

$$GPSD^k_{N_t \times R} = \begin{pmatrix} w^k_{1,1} & w^k_{1,2} & \cdots & w^k_{1,R} \\ w^k_{2,1} & w^k_{2,2} & \cdots & w^k_{2,R} \\ \vdots & \vdots & \ddots & \vdots \\ w^k_{N_t,1} & w^k_{N_t,2} & \cdots & w^k_{N_t,R} \end{pmatrix} =$$ [Equation 5]

-continued $$\underbrace{\begin{pmatrix} e^{j\theta_1 k} & 0 & \cdots & 0 \\ 0 & e^{j\theta_2 k} & \cdots & 0 \\ \vdots & \vdots & \ddots & 0 \\ 0 & 0 & 0 & e^{j\theta_{N_t} k} \end{pmatrix}}_{D^k} (U_{N_t \times R}^k)$$

Here, $GPSD_{N_t \times R}^k$ indicates a GPSD matrix for a kth resource index of a MIMO-OFDM signal having $N_t$ transmission antennas and an SM rate R, $U_{N_t \times R}$ is a unitary matrix (a second matrix, U) satisfying $U_{N_t \times R}^H \times U_{N_t \times R} = II_{R \times R}$. $U_{N_t \times R}$ is used to minimize interference between subcarrier symbols corresponding to respective antennas. Especially, $U_{N_t \times R}$ is desired to satisfy the condition of a unitary matrix in order to maintain characteristics of the unitary matrix of a diagonal matrix (a first matrix, D) for phase shift.

In Equation 5, a phase angle $\theta_i$ (where i=1, . . . , $N_t$) of a frequency domain have the following relationship with a delay time $\tau_i$ (where i=1, . . . , $N_t$) of a time domain.

$$\theta_i = -2\pi/N_{fft} \cdot \tau_i \quad \text{[Equation 6]}$$

Here, $N_{fft}$ denotes the number of subcarriers of an OFDM signal.

As indicated in Equation 5, a precoding matrix obtained by multiplying the first matrix corresponding to the diagonal matrix D by the second matrix corresponding to the unitary matrix U will be referred to as a 'basic structure of CDD based precoding' or a 'DU structure'.

Expansion of Generalized Phase-Shift Diversity—PDU/WDU Structure

In the above-described DU structure, an expanded CDD based precoding matrix may be constructed by adding a precoding matrix P selected from a codebook predetermined between transmitting and receiving sides to the basic structure of CDD based precoding comprised of a diagonal matrix D and a unitary matrix U. This may be expressed as follows.

$$GPSD_{N_t \times R}^k = (P_{N_t \times R}) \begin{pmatrix} e^{j\theta_1 k} & 0 & \cdots & 0 \\ 0 & e^{j\theta_2 k} & \cdots & 0 \\ \vdots & \vdots & \ddots & 0 \\ 0 & 0 & 0 & e^{j\theta_R k} \end{pmatrix} (U_{R \times R}) \quad \text{[Equation 7]}$$

The extended CDD based precoding matrix includes a precoding matrix P having a size of $N_t \times R$ added in front of the diagonal matrix compared to the matrix of Equation 5. Therefore, the size of the diagonal matrix is modified to $R \times R$. The added precoding matrix $P_{N_t \times R}$ may be differently set with respect to a specific frequency band or a specific subcarrier symbol and may be desirably set to use a fixed specific matrix in an open-loop system. A more optimized SNR ratio can be obtained by addition of the precoding matrix $P_{N_t \times R}$.

The added precoding matrix is selected from a codebook of a 3GPP LTE system and may be denoted as 'W'.

The expanded CDD based precoding matrix described above will be referred to as a 'PDU structure' or 'WDU structure.

Codebook Subset Restriction Technique

A codebook which is predetermined between transmitting and receiving sides for a 2-Tx system and a 4-Tx system in a 3GPP LTE system is shown in below.

TABLE 1

| Codebook Index | Number of layers v | |
|---|---|---|
| | 1 | 2 |
| 0 | $\frac{1}{\sqrt{2}}\begin{bmatrix}1\\1\end{bmatrix}$ | $\frac{1}{\sqrt{2}}\begin{bmatrix}1 & 0\\0 & 1\end{bmatrix}$ |
| 1 | $\frac{1}{\sqrt{2}}\begin{bmatrix}1\\-1\end{bmatrix}$ | $\frac{1}{2}\begin{bmatrix}1 & 1\\1 & -1\end{bmatrix}$ |
| 2 | $\frac{1}{\sqrt{2}}\begin{bmatrix}1\\j\end{bmatrix}$ | $\frac{1}{2}\begin{bmatrix}1 & 1\\j & -j\end{bmatrix}$ |
| 3 | $\frac{1}{\sqrt{2}}\begin{bmatrix}1\\-j\end{bmatrix}$ | |

TABLE 2

| Codebook Index | $u_n$ | Number of layers v | | | |
|---|---|---|---|---|---|
| | | 1 | 2 | 3 | 4 |
| 0 | $u_0 = [1\ -1\ -1\ -1]^T$ | $w_0^{\{1\}}$ | $W_0^{\{14\}}/\sqrt{2}$ | $W_0^{\{124\}}/\sqrt{3}$ | $W_0^{\{1234\}}/2$ |
| 1 | $u_1 = [1\ -j\ 1\ j]^T$ | $w_1^{\{1\}}$ | $W_1^{\{12\}}/\sqrt{2}$ | $W_1^{\{123\}}/\sqrt{3}$ | $W_1^{\{1234\}}/2$ |
| 2 | $u_2 = [1\ 1\ -1\ 1]^T$ | $w_2^{\{1\}}$ | $W_2^{\{12\}}/\sqrt{2}$ | $W_2^{\{123\}}/\sqrt{3}$ | $W_2^{\{3214\}}/2$ |
| 3 | $u_3 = [1\ j\ 1\ -j]^T$ | $w_3^{\{1\}}$ | $W_3^{\{12\}}/\sqrt{2}$ | $W_3^{\{123\}}/\sqrt{3}$ | $W_3^{\{3214\}}/2$ |
| 4 | $u_4 = [1\ (-1-j)/\sqrt{2}\ -j\ (1-j)/\sqrt{2}]^T$ | $w_4^{\{1\}}$ | $W_4^{\{14\}}/\sqrt{2}$ | $W_4^{\{124\}}/\sqrt{3}$ | $W_4^{\{1234\}}/2$ |
| 5 | $u_5 = [1\ (1-j)/\sqrt{2}\ j\ (-1-j)/\sqrt{2}]^T$ | $w_5^{\{1\}}$ | $W_5^{\{14\}}/\sqrt{2}$ | $W_5^{\{124\}}/\sqrt{3}$ | $W_5^{\{1234\}}/2$ |
| 6 | $u_6 = [1\ (1+j)/\sqrt{2}\ -j\ (-1+j)/\sqrt{2}]^T$ | $w_6^{\{1\}}$ | $W_6^{\{13\}}/\sqrt{2}$ | $W_6^{\{134\}}/\sqrt{3}$ | $W_6^{\{1324\}}/2$ |
| 7 | $u_7 = [1\ (-1+j)/\sqrt{2}\ j\ (1+j)/\sqrt{2}]^T$ | $w_7^{\{1\}}$ | $W_7^{\{13\}}/\sqrt{2}$ | $W_7^{\{134\}}/\sqrt{3}$ | $W_7^{\{1324\}}/2$ |
| 8 | $u_8 = [1\ -1\ 1\ 1]^T$ | $w_8^{\{1\}}$ | $W_8^{\{12\}}/\sqrt{2}$ | $W_8^{\{124\}}/\sqrt{3}$ | $W_8^{\{1234\}}/2$ |
| 9 | $u_9 = [1\ -j\ -1\ -j]^T$ | $w_9^{\{1\}}$ | $W_9^{\{14\}}/\sqrt{2}$ | $W_9^{\{134\}}/\sqrt{3}$ | $W_9^{\{1234\}}/2$ |
| 10 | $u_{10} = [1\ 1\ 1\ -1]^T$ | $w_{10}^{\{1\}}$ | $W_{10}^{\{13\}}/\sqrt{2}$ | $W_{10}^{\{123\}}/\sqrt{3}$ | $W_{10}^{\{1324\}}/2$ |
| 11 | $u_{11} = [1\ j\ -1\ j]^T$ | $w_{11}^{\{1\}}$ | $W_{11}^{\{13\}}/\sqrt{2}$ | $W_{11}^{\{134\}}/\sqrt{3}$ | $W_{11}^{\{1324\}}/2$ |
| 12 | $u_{12} = [1\ -1\ -1\ 1]^T$ | $w_{12}^{\{1\}}$ | $W_{12}^{\{12\}}/\sqrt{2}$ | $W_{12}^{\{123\}}/\sqrt{3}$ | $W_{12}^{\{1234\}}/2$ |
| 13 | $u_{13} = [1\ -1\ 1\ -1]^T$ | $w_{13}^{\{1\}}$ | $W_{13}^{\{13\}}/\sqrt{2}$ | $W_{13}^{\{123\}}/\sqrt{3}$ | $W_{13}^{\{1324\}}/2$ |
| 14 | $u_{14} = [1\ 1\ -1\ -1]^T$ | $w_{14}^{\{1\}}$ | $W_{14}^{\{13\}}/\sqrt{2}$ | $W_{14}^{\{123\}}/\sqrt{3}$ | $W_{14}^{\{3214\}}/2$ |
| 15 | $u_{15} = [1\ 1\ 1\ 1]^T$ | $w_{15}^{\{1\}}$ | $W_{15}^{\{12\}}/\sqrt{2}$ | $W_{15}^{\{123\}}/\sqrt{3}$ | $W_{15}^{\{1234\}}/2$ |

Table 1 shows a codebook used in a 2-Tx system and Table 2 shows a codebook used in a 4-Tx system.

Meanwhile, a codebook including $N_c$ precoding matrixes may use a codebook subset restriction technique which uses only a part of the codebook according to a base station and a mobile terminal. In this case, $N_c$ precoding matrixes may be restricted to $N_{restrict}$ precoding matrixes. The codebook subset restriction technique may be used to reduce multiple cell interference or to reduce complexity. It is assumed that $N_{restrict} \leq N_c$. For example, if the total number $N_c$ of precoding matrixes of a codebook is 6, a codebook $P_{N_t \times R}$ of an entire set and a codebook $P_{N_t \times R}^{restrict}$ which is determined to use only four precoding matrixes among 6 precoding matrixes can be expressed by the following Equation 8.

$$P_{N_t \times R} = \{P_{N_t \times R}^0, P_{N_t \times R}^1, P_{N_t \times R}^2, P_{N_t \times R}^3, P_{N_t \times R}^4, P_{N_t \times R}^5\},$$

$$P_{N_t \times R}^{restrict} = \{P_{N_t \times R}^0, P_{N_t \times R}^1, P_{N_t \times R}^2, P_{N_t \times R}^3, P_{N_t \times R}^5\} = W_{N_t \times R} = \{W_{N_t \times R}^0, W_{N_t \times R}^1, W_{N_t \times R}^2, W_{N_t \times R}^3\}$$

In Equation 8, $W_{N_t \times R}$ is an equivalent codebook rearranging an index of the codebook $P_{N_t \times R}^{restrict}$.

On the other hand, if a precoding matrix set determined between a transmitter and a receiver at a specific time is previously defined, the following Equation 9 may be obtained.

$$P_{N_t \times R} = \{P_{N_t \times R}^0, P_{N_t \times R}^1, \ldots, P_{N_t \times R}^{N_c-1}\} \quad \text{[Equation 9]}$$

$$GPSD_{N_t \times R}^k = (P_{N_t \times R}^{k \bmod N_c}) \begin{pmatrix} e^{j\theta_1 k} & 0 & \cdots & 0 \\ 0 & e^{j\theta_2 k} & \cdots & 0 \\ \vdots & \vdots & \ddots & 0 \\ 0 & 0 & 0 & e^{j\theta_R k} \end{pmatrix} (U_{R \times R})$$

In Equation 9, the precoding matrix set includes $N_c$ precoding matrixes. Equation 9 may be simplified into Equation 10.

$$P_{N_t \times R} = \{P_{N_t \times R}^0, P_{N_t \times R}^1, \ldots, P_{N_t \times R}^{N_c-1}\}$$

$$GPSD_{N_t \times R}^k = (P_{N_t \times R}^{k \bmod N_c}) \Pi_{R \times R}^k \quad \text{[Equation 10]}$$

Equation 8 and Equation 9 indicate methods using precoding matrixes by cyclic repetition within the codebook $P_{N_t \times R}$ according to subcarriers or resource indexes. In Equation 10, $\Pi_{R \times R}^k$ serves to mix data streams. $\Pi_{R \times R}^k$ which may be referred to as a data stream substitution matrix, may be selected according to an SM rate R as indicated in Equation 9. $\Pi_{R \times R}^k$ may be expressed as a simple form as shown in the following Equation 11.

[Equation 11]

SM rate: 2

$$\prod_{2 \times 2}^k \begin{pmatrix} 0 & 1 \\ 1 & 0 \end{pmatrix}^k \text{ or } \begin{pmatrix} 1 & 0 \\ 0 & e^{j\theta_1 k} \end{pmatrix} DFT_{2 \times 2}$$

SM rate: 3

$$\prod_{3 \times 3}^k \begin{pmatrix} 0 & 1 & 0 \\ 0 & 0 & 1 \\ 1 & 0 & 0 \end{pmatrix}^k \text{ or } \begin{pmatrix} 1 & 0 & 0 \\ 0 & e^{j\theta_1 k} & 0 \\ 0 & 0 & e^{j\theta_2 k} \end{pmatrix} DFT_{3 \times 3}$$

SM rate: 4

$$\prod_{4 \times 4}^k \begin{pmatrix} 0 & 1 & 0 & 0 \\ 0 & 0 & 1 & 0 \\ 0 & 0 & 0 & 1 \\ 1 & 0 & 0 & 0 \end{pmatrix}^k \text{ or}$$

$$\begin{pmatrix} 1 & 0 & 0 & 0 \\ 0 & e^{j\theta_1 k} & 0 & 0 \\ 0 & 0 & e^{j\theta_2 k} & 0 \\ 0 & 0 & 0 & e^{j\theta_3 k} \end{pmatrix} DFT_{4 \times 4}$$

The methods using the precoding matrixes within the above-described codebook by cyclic repetition may also be used within a codebook in which a codebook restriction technique is applied. For example, if $W_{N_t \times R}$ in Equation 8 is applied, Equation 10 may be expressed as follows.

$$P_{N_t \times R}^{restrict} = \{P_{N_t \times R}^0, P_{N_t \times R}^2, P_{N_t \times R}^3, P_{N_t \times R}^5\} = W_{N_t \times R} = \{W_{N_t \times R}^0, W_{N_t \times R}^1, W_{N_t \times R}^2, W_{N_t \times R}^3\}$$

$$GPSD_{N_t \times R}^k = (W_{N_t \times R}^{k \bmod N_{restrict}}) \Pi_{R \times R}^k \quad \text{[Equation 12]}$$

In Equation 12, k indicates a resource index, and $N_{restrict}$ is 4. Namely, Equation 12 shows a method using precoding matrixes by cyclic repetition within indicating a codebook in which a precoding matrix is restricted according to subcarriers or resource indexes.

As mentioned previously, when performing the CDD based precoding using the entire ranks in a 2-TX system which employs an open-loop spatial transmission mode, since a sufficient frequency diversity gain can be acquired due to large delay CDD, a precoding matrix W may be fixed to any one for simple achievement. In the following embodiments, a method for selecting a desirable precoding matrix when performing the CDD based precoding using the fixed precoding matrix will be described.

CDD Based Precoding Method in Open-Loop Spatial Multiplexing (SM) Mode

The large delay CDD precoding of an open-loop SM mode may be performed according to the PDU structure or WDU structure as indicated by the above Equation 7. To explain the above-described cyclic application concept, the large delay CDD precoding may be expressed as follows.

$$W_{N_t \times R}^{\lfloor \frac{i}{v} \rfloor \bmod N_c} \underbrace{\begin{pmatrix} 1 & 0 & 0 & 0 \\ 0 & e^{j\theta_1 i} & 0 & 0 \\ 0 & 0 & \ddots & 0 \\ 0 & 0 & 0 & e^{j\theta_{R-1} i} \end{pmatrix}}_{D(i)} U_{R \times R} \quad \text{[Equation 13]}$$

Here, $N_c$ indicates the number of precoding matrixes within a codebook subset, v indicates the number of successive resource elements using the same precoding matrix, and i is a resource index like k. Therefore, the precoding matrix is modified every resource index i so that $N_c$ precoding matrixes may be cyclically used. An additional description of the large delay CDD scheme is as follows:

(1) A precoding matrix index (PMI) is not used;
(2) In a 2-Tx system, $N_c$ is set to 1;
(3) In a 4-Tx system, $N_c$ is set to 4 and a matrix index uses {12, 13, 14, 15} of Table 2 irrespective of rank;
(4) The open-loop large delay CDD scheme is applied only when rank is greater than 1 and a transmission diversity scheme is used for rank 1; and (5) A dynamic rank application may be used between the transmission diversity scheme and an open-loop SM scheme.

In 4-Tx antennas, only four matrixes are used among 16 matrixes indicated in Table 2 irrespective of rank in order to acquire a sufficient diversity gain and simultaneously to reduce decoding complexity. However, in 2-TX open-loop SM, only one matrix is used among three matrixes for rank 2 in Table 1. Therefore, it is important to correctly select the used matrix and in an exemplary embodiment, a method for selecting a precoding matrix for large delay CDD based precoding in a 2-Tx open-loop SM scheme is proposed.

First, rank 2 is considered from Table 1 as follows.

$$rank2 = \left\{ \underbrace{\frac{1}{\sqrt{2}}\begin{pmatrix}1 & 0\\0 & 1\end{pmatrix}}_{index\_0}, \underbrace{\frac{1}{2}\begin{pmatrix}1 & 1\\1 & -1\end{pmatrix}}_{index\_1}, \underbrace{\frac{1}{2}\begin{pmatrix}1 & 1\\j & -j\end{pmatrix}}_{index\_2} \right\}$$ [Equation 14]

In Equation 14, index 1 and index 2 perform a function similar to an identity matrix performing column switching when combined with the large delay CDD. However, when using a precoding matrix of index 0 in the large delay CDD based precoding, the open-loop SM serves as a discrete Fourier transform (DFT) matrix performing column switching and can obtain a high SNR gain in a moderate correlation channel. Accordingly, in an exemplary embodiment of the present invention, a method is provided for performing precoding for rank 2 in a 2-Tx open-loop SM transmission mode by a matrix WDU or PDU in which a first matrix W corresponding to an identity matrix of index 0 of Equation 14, a second matrix D corresponding to a diagonal matrix, and a third matrix U corresponding to a unitary matrix are sequentially multiplied, and for transmitting the precoded signals. The present inventor performed the following simulation to determine if there was any difference in performance when a matrix of index 0 as the first matrix W is used and when a matrix of index 1 or index 2 as the first matrix W is used.

<Simulation Result>

In the open-loop CDD based precoding, similar performances are obtained when using index 1 of Equation 14 and when using index 2 of Equation 14. In this simulation, W in the WDU structure when using index 0 of Equation 14 was compared with W when using index 1 of Equation 14. Further, the performance of 2-TX open-loop SM was compared according to a rank-2 matrix index, an MCS level, and a channel mode. To provide stability under a fast channel update environment, a high time varying channel in which a long-term link adaptation of a distributed transmission mode is generally used was assumed. Table 3 below shows other assumptions of the link level simulation.

TABLE 3

| Parameter | Assumption |
| --- | --- |
| OFDM Parameters | 5 MHz |
| Subframe length | 1.0 ms |
| Resource Allocation | Distributed Transmission Mode |
| # used resource | 2RBs |
| Channel Models | ITU-PedA and 6-ray TU |
| Channel Correlation (Tx, Rx) | (0%, 0%) or (50%, 50%) |
| Mobile Speed (Km/h) | 30 Km/h |
| Modulation Schemes and Channel Coding Rates | QPSK (R = ½) 16-QAM (R = ½, ⅔) |
| Channel Code | Turbo Code Component Decoder: max-log-MAP |

TABLE 3-continued

| Parameter | Assumption |
| --- | --- |
| Fixed Unitary Matrix $U_{R \times R}$ | $R \times R$ DFT Matrix |
| Antenna Configuration | 2 transmitter, 2 receiver (rank-2) → [2Tx, 2Rx] |
| Channel Estimation | Perfect Channel Estimation |
| MIMO receiver | Minimum Mean Squared Error (MMSE) Filter |

Figure 6:
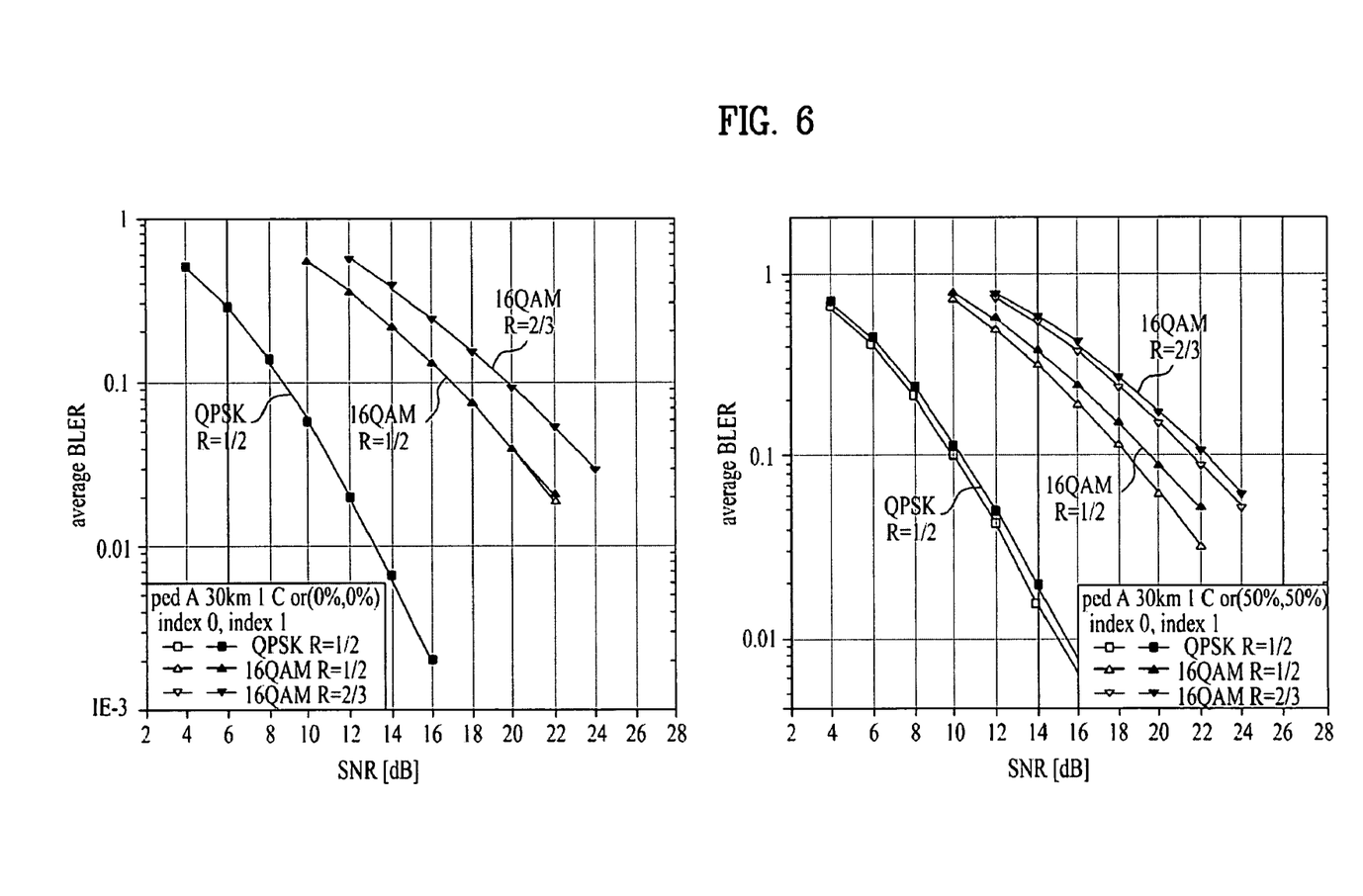
FIG. 6 is graphs illustrating a comparison of performances when using index 0 and index 1 for rank 2 of a 2-Tx codebook with respect to open-loop spatial multiplexing (SM) in an ITU-PedA channel.

FIG. 6 is graphs illustrating a comparison of performances when using index 0 and index 1 for rank 2 of a 2-Tx codebook with respect to open-loop SM in an ITU-pedestrian A (PedA) channel.

As depicted in FIG. 6, performances when using index 0 and index 1 under an uncorrelated spatial channel are similar. However, under a highly correlated spatial channel, using index 0 for rank 2 of the 2-Tx codebook provides better performance than when using index 1. This may be because a DFT matrix forms beams and provides an SNR gain by averaging two beams. When a high modulation level is used, using index 0 for rank 2 of the 2-Tx codebook shows higher performance improvement than when using index 1.

Figure 7:
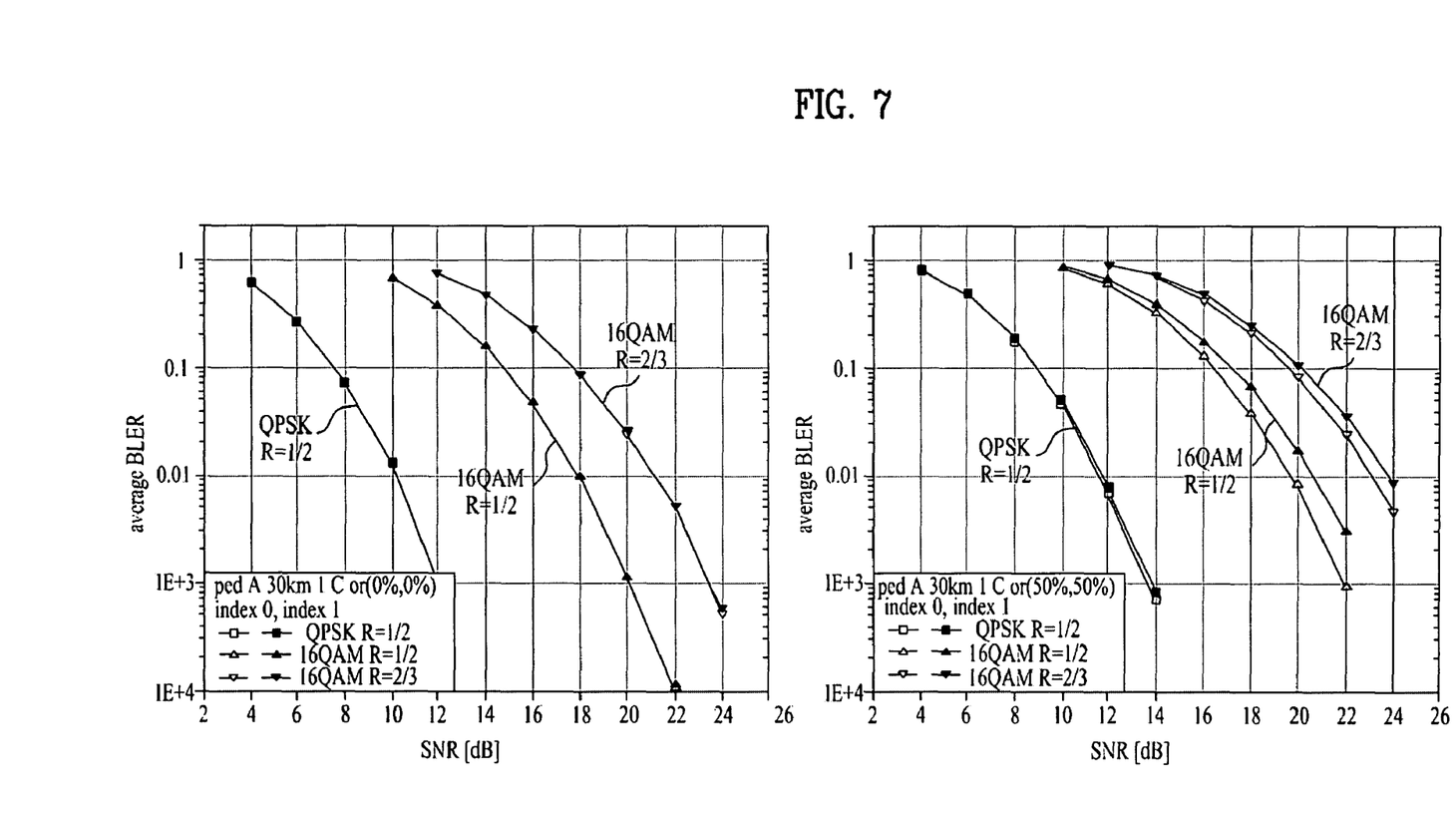
FIG. 7 is graphs illustrating a comparison of performances when using index 0 and index 1 for rank 2 of a 2-Tx codebook with respect to open-loop SM in a 6-Ray TU channel.

FIG. 7 is graphs illustrating a comparison of performances when using index 0 and index 1 for rank 2 of a 2-Tx codebook with respect to open-loop SM in a 6-Ray typical urban (TU) channel.

FIG. 7 shows a performance comparison similar to FIG. 6 except for a channel mode. As depicted in FIG. 7, an improved performance gain is provided even in a sufficient frequency diversity channel when using index 0.

The method for a mobile terminal to receive signals from a base station may be summarized as follows. When the mobile terminal receives signals in an open-loop SM transmission mode, the mobile terminal receives a rank indicator through downlink control information. If the received rank indicator indicates 1, the mobile terminal estimates that the base station transmits signals according to a transmission diversity scheme. If the received rank indicator indicates a number greater than 1, the mobile terminal estimates that the base station transmits signals according to a CDD scheme.

If the rank indicator designates a number greater than 1, that is, if the base station transmits signals according to a CDD scheme, a signal receiving method may vary according to the number of transmit antennas. Namely, in case of 4 Tx antennas, the mobile terminal estimates that the base station performs precoding by cyclically applying 4 precoding matrixes among 16 codebooks to P or W of the PDU/WDU structure. In case of 2 Tx antennas, the mobile terminal estimates that the base station performs precoding by applying an identity matrix corresponding to index 0 of Equation 14 to P or W of the PDU/WDU structure. The mobile terminal receives signals according to an estimated result.

In case of 2-Tx antennas and rank 2, a diagonal matrix part of the PDU/WDU structure has the form of 2×2. That is, an identity matrix is used as P or W of the PDU/WDU structure and the number of transmit antennas is the same as the number of ranks. Accordingly, it can be understood that the basic structure of the CDD based precoding or the DU structure is substantially applied.

It will be apparent to those skilled in the art that various modifications and variations can be made in the present invention without departing from the spirit or scope of the invention. Thus, the present invention is not intended to be limited to the embodiments described, but it to be accorded the broadest scope consistent with the claims appended hereto and the disclosure set forth herein.

The signal transmitting and receiving method of the present invention provides a sufficient diversity gain by efficiently selecting a precoding matrix according to each transmission mode. The above method may be applied not only to a 3GPP LTE system but also to any multiple antenna communication systems using the CDD based precoding by the same principle.

What is claimed is:

1. A method for user equipment (UE) to receive signals transmitted from a base station, the method comprising:
    receiving information about the number of transmission antennas from the base station; and
    receiving signals based on an assumption that the base station transmits signals through precoding by using a matrix for large delay cyclic delay diversity (CDD) based precoding in a 2-transmit antenna, open-loop, spatial multiplexing (SM) transmission mode,
    wherein the matrix can be generated in a form of WDU in which a first matrix (W), a second matrix (D) corresponding to a diagonal matrix, and a third matrix (U) corresponding to a unitary matrix are sequentially multiplied, and
    wherein the UE assumes that the base station using the 2-transmit antenna, open-loop SM transmission mode fixedly uses the first matrix as an identity matrix (I) in the matrix for the large delay CDD based precoding.

2. The method according to claim 1, wherein the second matrix (D) is a 2×2 matrix when the number of transmit antennas is 2 and a transmission rank is 2.

3. The method according to claim 1, wherein the UE assumes that the base station using the 2-transmit antenna, open-loop SM transmission mode fixedly uses the first matrix as $$\frac{1}{\sqrt{2}}\begin{bmatrix} 1 & 0 \\ 0 & 1 \end{bmatrix}$$

in the matrix for the large delay CDD based precoding, and the UE does not feedback a precoding matrix index (PMI) to the base station.

4. A method for a base station to transmit signals to user equipment (UE), the method comprising:
    performing precoding of transmission signals by using a matrix for large delay cyclic delay diversity (CDD) based precoding in a 2-transmit antenna, open-loop, spatial multiplexing (SM) transmission mode, wherein the matrix can be generated in a form of WDU in which a first matrix (W), a second matrix (D) corresponding to a diagonal matrix, and a third matrix (U) corresponding to a unitary matrix are sequentially multiplied;
    mapping the precoded signals to resource elements; and
    transmitting the mapped signals to the UE,
    wherein the base station using the 2-transmit antenna, open-loop SM transmission mode fixedly uses the first matrix as an identity matrix (I) in the matrix for the large delay CDD based precoding.

5. The method according to claim 4, wherein the second matrix is a 2×2 matrix when the number of transmit antennas is 2 and a transmission rank is 2.

6. The method according to claim 4, wherein the base station using the 2-transmit antenna, open-loop SM transmission mode fixedly uses the first matrix as $$\frac{1}{\sqrt{2}}\begin{bmatrix} 1 & 0 \\ 0 & 1 \end{bmatrix}$$

in the matrix for the large delay CDD based precoding, a precoding matrix index is not fed back to the base station from the UE.

7. User equipment (UE) for receiving signals transmitted from a base station, the UE comprising:
    a receiver configured to receive information about the number of transmission antennas from the base station and to receive signals based on an assumption that the base station transmits signals through precoding by using a matrix for large delay cyclic delay diversity (CDD) based precoding in a 2-transmit antenna, open-loop, spatial multiplexing (SM) transmission mode,
    wherein the matrix can be generated in a form of WDU in which a first matrix (W), a second matrix (D) corresponding to a diagonal matrix, and a third matrix (U) corresponding to a unitary matrix are sequentially multiplied, and
    wherein the UE assumes that the base station using the 2-transmit antenna, open-loop SM transmission mode fixedly uses the first matrix as an identity matrix (I) in the matrix for the large delay CDD based precoding.

8. The UE of claim 7, further comprises at least one of a multiple antenna decoder, a parallel to serial converter, a demapper and a channel decoder.

9. The UE of claim 7, wherein the second matrix (D) is a 2×2 matrix when the number of transmit antennas is 2 and a transmission rank is 2.

10. The UE of claim 7, wherein the UE assumes that the base station using the 2-transmit antenna, open-loop SM transmission mode fixedly uses the first matrix as $$\frac{1}{\sqrt{2}}\begin{bmatrix} 1 & 0 \\ 0 & 1 \end{bmatrix}$$

in the matrix for the large delay CDD based precoding, and the UE does not feedback a precoding matrix index (PMI) to the base station.

11. A base station for transmitting signals to user equipment (UE), the base station comprising:
    a precoder configured to perform precoding of transmission signals by using a matrix for large delay cyclic delay diversity (CDD) based precoding in a 2-transmit antenna, open-loop, spatial multiplexing (SM) transmission mode, wherein the matrix can be generated in a form of WDU in which a first matrix (W), a second matrix (D) corresponding to a diagonal matrix, and a third matrix (U) corresponding to a unitary matrix are sequentially multiplied;
    a resource element mapper configured to map the precoded signals to resource elements; and
    a transmitter configured to transmit the resource mapped signals to the UE, wherein the base station using the 2-transmit antenna, open-loop SM scheme fixedly uses the first matrix as an identity matrix (I) in the matrix for the large delay CDD based precoding.

12. The base station of claim 11, wherein the second matrix is a 2×2 matrix when the number of transmit antennas is 2 and a transmission rank is 2.

13. The base station of claim 11, wherein the base station using the 2-transmit antenna, open-loop SM transmission mode fixedly uses the first matrix as $$\frac{1}{\sqrt{2}}\begin{bmatrix} 1 & 0 \\ 0 & 1 \end{bmatrix}$$

in the matrix for the large delay CDD based precoding, and a precoding matrix index is not fed back to the base station from the UE.

\* \* \* \* \*